UNITED STATES PATENT OFFICE.

HENRY CARL FEHRLIN, OF MILWAUKEE, WISCONSIN.

PROCESS OF MAKING SALOL.

SPECIFICATION forming part of Letters Patent No. 642,218, dated January 30, 1900.

Application filed May 22, 1899. Serial No. 717,838. (No specimens.)

*To all whom it may concern:*

Be it known that I, HENRY CARL FEHRLIN, doctor of philosophy, a citizen of the United States, residing at Milwaukee, in the county of Milwaukee and State of Wisconsin, have invented certain new and useful Improvements in Processes of Manufacturing Salol, of which the following is a full, clear, and exact description, which will enable others skilled in the art to which it appertains to use the same.

Heretofore salol has been produced by treating mixtures of salicylic acid and phenol or neutral and basic salts of the acid and phenol or phenolate of soda with phosphorus oxychlorid, carbonyl chlorid, or other similarly-acting reagents, as described in Letters Patent No. 350,012, dated the 28th day of September, 1886, to Marcel von Nencki; No. 377,311, dated the 31st day of January, 1888, to Carl Kolbe; No. 383,306, dated the 22d day of May, 1888, also to Carl Kolbe; No. 391,248, dated the 16th day of October, 1888, to Panajota W. Hofman, and also No. 622,456, dated the 4th day of April, 1899, issued to myself.

I have now discovered that salol can also be advantageously produced from salts of acid-phenyl-carbonic ether by subjecting the same to the action of $POCl_3$ or $COCl_2$ or one of the other similarly-acting reagents. The salol is then formed according to the following equations:

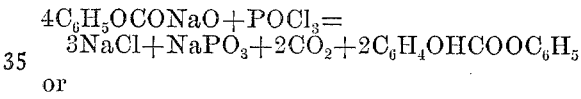

or

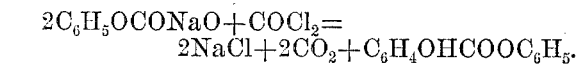

In order to carry out my process, I first produce salts of said acid-phenyl-carbonic ether—for instance, phenyl-sodium carbonate $C_6H_5OCONaO$—by subjecting perfectly dry phenolate of soda in autoclaves to the action of carbonic acid, substantially as described in Letters Patent No. 334,290, granted to Rud. Schmitt. I then treat the product at an ordinary temperature with $COCl_2$ or other similarly-acting reagents, as $POCl_3$, until satisfactory conversion of the sodium-phenyl carbonate into salol is effected, which reaction takes place under a spontaneous production of heat. The product thus obtained is washed with a solution of soda and then the salol distilled off in a current of steam, whereby said salol is obtained as a colorless product, which can be further purified by crystallization from alcohol.

I do not claim anything disclosed in the patents referred to; but

What I claim as new in my present application, and desire to secure by Letters Patent, is—

1. The within-described process of producing salol from alcaline and earthy alcaline salts of acid-phenyl-carbonic ether, by the action of phosphorus oxychlorid.

2. The within-described process of producing salol from sodium-phenyl carbonate by subjecting the same to the action of phosphorus oxychlorid until satisfactory conversion of the sodium-phenyl carbonate into salol is effected, subsequently treating the product with a solution of soda, and finally, distilling off the salol in a current of steam.

In testimony whereof I affix my signature in presence of two witnesses.

HENRY CARL FEHRLIN.

Witnesses:
F. B. HUCHTING,
J. E. HUCHTING.